United States Patent
Ehrlich

(12) 
(10) Patent No.: US 6,203,949 B1
(45) Date of Patent: Mar. 20, 2001

(54) SOLID ELECTROLYTE FOR AN ELECTROCHEMICAL CELL COMPOSED OF AN INORGANIC METAL OXIDE NETWORK ENCAPSULATING A LIQUID ELECTROLYTE

(75) Inventor: Grant M. Ehrlich, Westerly, RI (US)

(73) Assignee: Yardney Technical Products, Inc., Pawcatuck, CT (US)

( * ) Notice: Subject to any disclaimer, the term of this patent is extended or adjusted under 35 U.S.C. 154(b) by 0 days.

(21) Appl. No.: 09/137,492

(22) Filed: Aug. 21, 1998

Related U.S. Application Data

(60) Provisional application No. 60/056,740, filed on Aug. 22, 1997.

(51) Int. Cl.⁷ ...................................................... H01M 6/18
(52) U.S. Cl. ...................... 429/304; 429/302; 429/330; 429/332; 429/335; 429/326
(58) Field of Search .................................... 429/101, 104, 429/33, 188, 304, 302, 326, 327, 330, 332, 335

(56) References Cited

U.S. PATENT DOCUMENTS

| | | | | |
|---|---|---|---|---|
| 5,016,991 | * | 5/1991 | Mason ................................. | 429/192 |
| 5,079,109 | * | 1/1992 | Takami et al. ...................... | 429/197 |
| 5,229,225 | * | 7/1993 | Shackle .............................. | 429/191 |
| 5,294,503 | * | 3/1994 | Huang et al. ...................... | 429/194 |
| 5,418,091 | * | 5/1995 | Gozdz et al. ...................... | 429/252 |
| 5,478,672 | * | 12/1995 | Mitate ................................ | 429/194 |

\* cited by examiner

*Primary Examiner*—Laura Weiner
(74) *Attorney, Agent, or Firm*—John R. Doherty

(57) ABSTRACT

A solid polymer electrolyte for an electrochemical cell is prepared by a sol-gel process in which an active metal ion conducting liquid electrolyte, e.g. a lithium-ion electrolyte, containing a salt which is stable in the presence of water, e.g. lithium bisperfluoroethanesulfonimide, $LiN(SO_2C_2F_5)_2$, is admixed in aqueous solution with an alkoxide, e.g. silica alkoxide, to form a liquid precursor which is added to the electrochemical cell between the anode and cathode thereof and allowed to solidify in situ to form the solid electroyte.

23 Claims, 2 Drawing Sheets

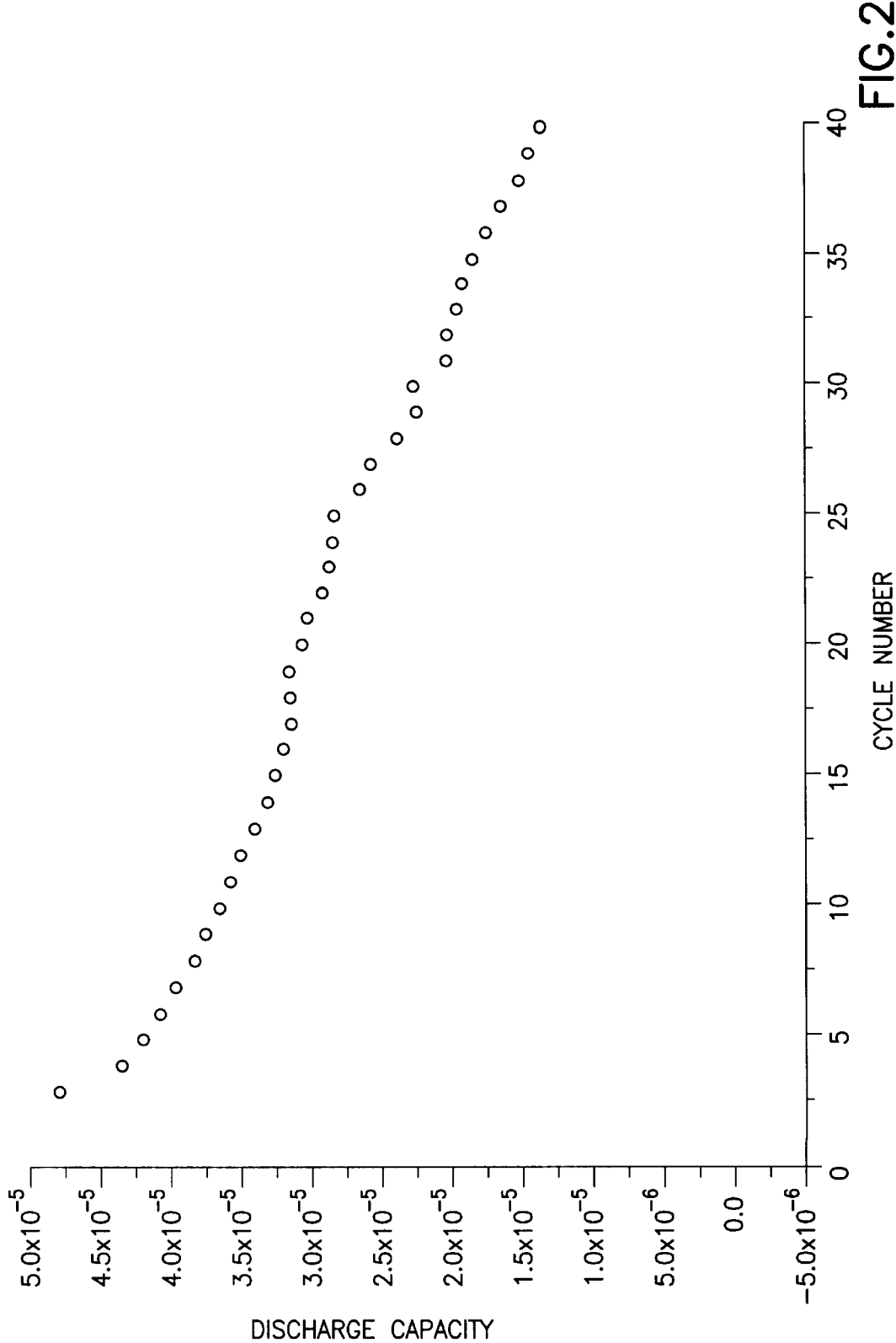

SOLID ELECTROLYTE FOR AN ELECTROCHEMICAL CELL COMPOSED OF AN INORGANIC METAL OXIDE NETWORK ENCAPSULATING A LIQUID ELECTROLYTE

This application claims benefit of provisional application Ser. No. 60/056,740 filed on Aug. 22, 1997.

BACKGROUND OF THE INVENTION (1) Field of the Invention

The present invention relates to a solid polymer electrolyte and to an electrochemical cell employing such an electrolyte. In a preferred aspect, the invention relates to a lithium-ion electrochemical cell employing a novel and improved solid polymer electrolyte/separator which can be processed as a liquid and to a method for assembling such a cell. The invention is particularly directed to an improved method for the facile fabrication of electrochemical cells with improved safety characteristics.

(2) Description of the Prior Art

Electrochemical cells, such as Li-ion cells, require an electrolyte to permit transport of the cationic species, in this example, lithium ions, between the cathode and anode as the cell is charged and discharged. To prevent electronic short circuit in the cell, an electrically insulating material is need to separate the cathode and anode in the cell.

The prior art includes a wide variety of mixtures which may be classified as liquid electrolytes. When applied to lithium-ion electrochemical cells, prior art electrolytes include those consisting of a solution of a salt, such as lithium hexaflurorophosphate or lithium hexafluoroborate, in a solvent mixture typically containing one or more carbonate type solvents, such as propylene carbonate, ethylene carbonate or dimethyl carbonate. Liquid electrolytes have a number of significant disadvantages, notably, they freeze at low temperatures, are liquid and free flowing at intermediate temperatures and thus able to leak and they degrade at elevated temperatures. Moreover, liquid electrolytes have a high volatility and are thus able to vent and burn.

The prior art also includes polymer electrolytes. These electrolytes are solid phase organic materials that have appreciable ionic conductivity, typical for lithium. They include polyethylene oxide, polyether and poly (dimethylsiloxane) polymers, for example. The ionic conductivity of these polymer electrolytes is usually poor at room temperature and accordingly they must be heated to above about 40° C. to operate. Unfortunately, none of these electrolytes operate at low temperatures. Electrochemical cells or batteries which utilize these electrolytes are typically maintained at temperatures between about 40° C. and 80° C. during operation. Below 40° C. the ionic conductivity of the electrolyte is too low for operation of the cell whereas at higher temperatures, above about 80° C., decomposition of the organic polymer ensues. Moreover, for processing reasons, the minimum useable thickness of some polymer electrolytes is over double that typical in a liquid electrolyte cell. The increased cathode-anode distance and lower ionic conductivity result in poor rate capability in such polymer electrolyte cells when compared to liquid electrolyte cells.

Gel electrolytes are another class of electrolytes known in the prior art. They typically embody a polymer host, such as poly(ethylene oxide) or poly(vinylidine fluoride) or copolymers such as poly(vinylidine fluoride)-hexafluoropropylene and a liquid electrolyte guest or "plasticizing agent" containing a lithium salt and a solvent such as ethylene carbonate or dimethylcarbonate. Gel electrolytes are usually fabricated as a free standing film. Cells utilizing gel electrolytes must be fabricated by incorporating the polymer host between the cathode and anode during cell fabrication. Such materials are typically "activated" after cell fabrication by addition of liquid electrolyte which is absorbed into the polymer host material.

Gel electrolytes possess all of the disadvantages of liquid electrolytes with many of the inhibitions of polymer electrolytes. They achieve a conductivity which is close to but below that of liquid electrolytes by incorporating liquid electrolytes into a polymer host. As a result, they have volatility and flammability comparable to liquid electrolytes. Gel electrolytes also have processing inhibitions similar to polymer electrolytes. As a result, cells with gel electrolytes typically have rate capability inferior to comparable cells which use a liquid electrolyte.

Solid electrolytes are also known in the prior art. They include ceramic materials such as lithium phosphorous oxynitride and are able to conduct lithium ions. Ceramic materials typically have ionic conductivity 1000 times less than liquid electrolytes and are brittle. Such materials must be deposited by a plasma or gas phase method such as sputtering onto one electrode and then the other electrode deposited onto the electrolyte layer. To date, solid electrolytes have only found application in very small cells due to manufacturing limitations inherent in a ceramic device. Solid electrolytes present many difficulties in achieving a viable interface between the electrolyte and the electrode materials.

In a recent article entitled "Synthesis and Properties of Sol-Gel Derived Electrodes and Electrolyte Materials", by J. Harreld et al appearing in "The Proceedings of the 5th Workshop for Battery Exploratory Development", published on Jun. 30, 1997, there is disclosed a solid electrolyte material which exhibits a high lithium, ion conductivity. The solid electrolyte was prepared by a known sol-gel process wherein a hydrolyzed silica precursor, namely, (tetramethyl) orthosilicate, $Si(OCH_3)_4$, was admixed with a lithium, ion conducting liquid electrolyte along with deionized water and an acid catalyst to form a lithium conductive sol. The liquid lithium electrolyte was prepared by dissolving ethylene carbonate with lithium borofluorate, $LiBF_4$ in a propylene carbonate solvent to a molarity of 1.65M. After ageing and drying, Si—O—Si linkages form within the sol and a three-dimensional silicate network develops in which the liquid phase is encapsulated. The liquid electrolyte provides ionic conductivity while the silica linkages support the liquid electrolyte.

Experimentation with the solid electrolyte material disclosed in the above article has shown that the lithium borofluorate, $LiBF_4$, component in the liquid electrolyte reacts with water in the reaction mixture and is not stable. This of course precludes use of this solid electrolyte material in the fabrication of a working electrochemical cell.

Reference is also made to an article entitled "Sol-Gel Approaches for Solid Electrolytes and Electrode Materials" by B. Dunn et al, appearing in "Solid State Ionics", (1994). This article describes the sol-gel process in greater detail and the concept of using an inorganic gel in combination with an organic ionic conductor. The authors describe the use of only one salt in preparation of the liquid electrolyte, namely, lithium perchlorate, $LiClO_4$. They also note that in addition to silicon alkoxides, other metal alkoxides could be used in the sol-gel process such as the metal alkoxides of aluminum, titanium, vanadium, molybdenum and tungsten.

SUMMARY OF THE INVENTION

In accordance with the present invention, I have discovered that a working electrochemical cell can be fabricated using a sol-gel solid electrolyte employing in the liquid phase a salt which is stable in the presence of water. The salt may be an alkali metal or alkaline earth metal salt and preferable is an organic lithium salt which is not reactive with water.

In the illustrated embodiment, the salt is lithium Bisperfluoroethanesulfonimide, $LiN(SO_2C_2F_5)_2$.

The solid electrolyte is prepared by the sol-gel process in which a hydrolyzed metal precursor, that is, a metal alkoxide, such as a silica alkoxide, is admixed in aqueous solution with an active metal ion conducting liquid electrolyte, preferably a lithium-ion electrolyte, and an acid catalyst. The liquid electrolyte may be prepared by dissolving the water stable alkali metal or alkaline earth metal salt with a suitable solvent, such as an organic solvent containing one or more carbonates. The admixture is added as a liquid precursor to an electrochemical cell employing the usual anode and cathode materials and is allowed to gel or polymerize in situ to form the solid electrolyte of the invention.

Thus, the invention comprehends a novel method for fabricating an electrochemical cell employing a sol-gel solid electrolyte in which the electrolyte is added to the cell in its unactivated condition as a liquid and then solidifies to form a solid electrolyte, thereby enabling the manufacture of solid electrochemical cells as a liquid electrochemical system.

The invention also comprehends a solid electrolyte or separator medium for an electrochemical cell which after polymerization and drying comprises an inorganic metal oxide network encapsulating a liquid solution containing a salt which does not decompose in the presence of water, and a carbonate containing compound.

In the illustrated embodiment, the inorganic metal oxide network is silica($SiO_2$) and the liquid salt is lithium Bisperfluoroethanesulfonimide, $LiN(SO_2C_2F_5)_2$.

The invention further comprehends an electrochemical cell employing the above described inorganic metal oxide/encapsulated liquid salt electrolyte interposed between an anode and a cathode electrode in a standard facile fabrication.

In the illustrated embodiment, the cell is a lithium-ion cell employing a lithiated cobalt oxide based cathode and a carbon based anode together with a glass fiber separator containing the solid electrolyte of the invention

BRIEF DESCRIPTION OF THE DRAWINGS

The invention will now be described in greater detail in the following description of the preferred embodiments thereof taken in conjunction with the accompanying drawings wherein:

FIG. 2 is a plot of discharge capacity verses cycle number for the same electrolytic cell whose charge and discharge characteristics are shown in FIG. 1.

DESCRIPTION OF THE PREFERRED EMBODIMENTS

Figure 1:
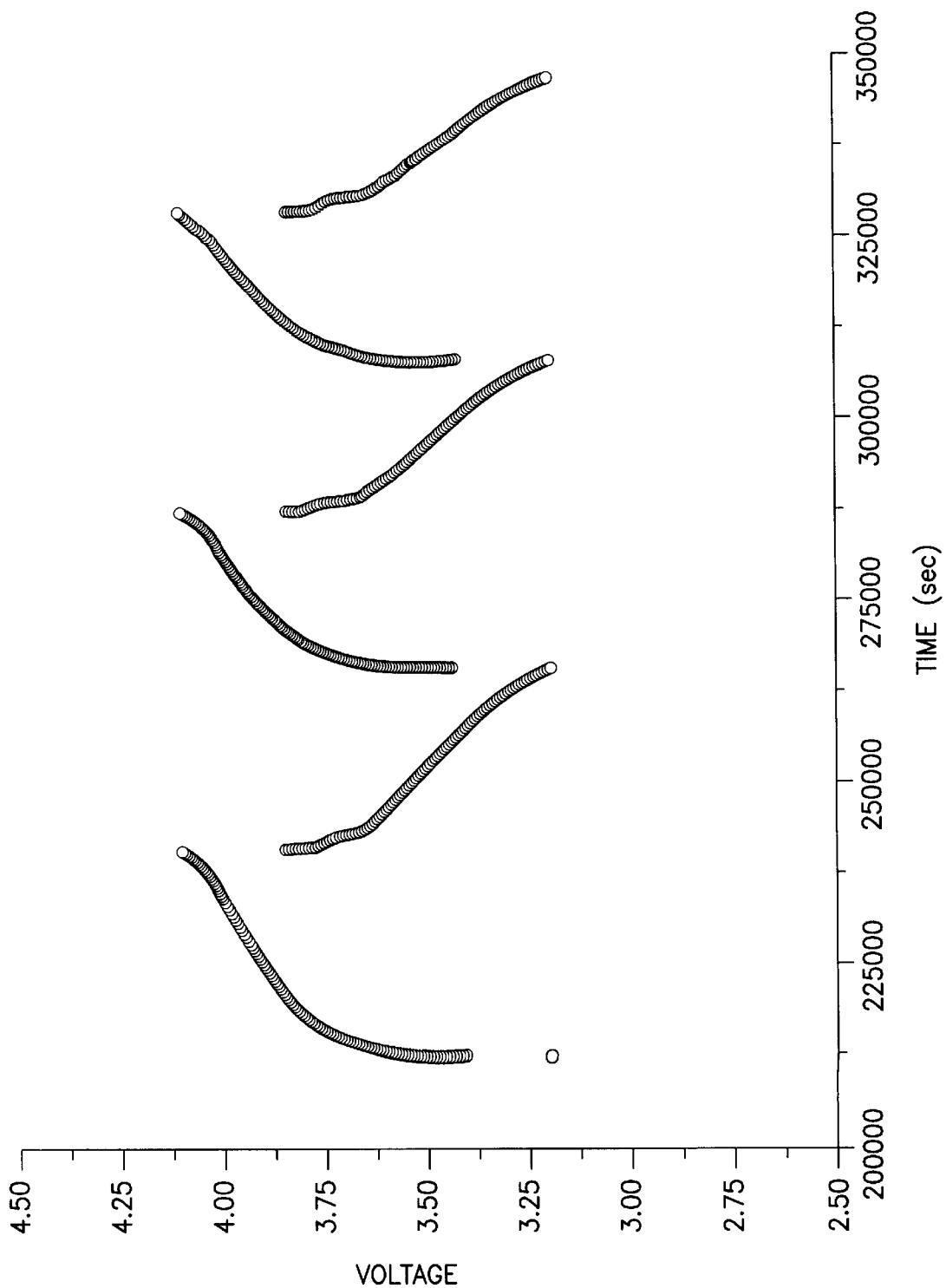
FIG. 1 is a series of voltage/time curves illustrating the charge and discharge characteristics of an electrochemical cell employing a solid polymer electrolyte according to a preferred embodiment of the invention.

The present invention comprehends the preparation of a novel solid polymer electrolyte and separator or both utilizing the sol-gel process described in the above noted Harreld et al article, but in which the liquid electrolyte phase employs a salt which does not decompose in the presence of water. The invention also comprehends a novel electrochemical cell using such a solid polymer electrolyte and/or separator and a novel method for fabricating such an electrochemical cell wherein the electrolyte is added to the cell as a liquid percussor in the same manner as in a liquid electrolyte system. The following description will be limited to one type of solid polymer electrolyte and electrochemical cell, namely, a lithium-ion conducting electrolyte and a lithium-ion electrochemical cell but it will be understood that the invention may be applicable to other solid electrolyte and cell systems such as $Li/MnO_2$ cells, those which employ a negative electrode material of lithium and a positive electrode material of manganese oxide, or lithium thionyl chloride ($Li/SOCl_2$) cells as will readily occur to those skilled in the art.

The solid polymer electrolyte of the invention may be prepared using the sol-gel process by mixing a metal alkoxide, preferably a hydrolyzed silica alkoxide such as (tetramethyl) orthosilicate, $Si(OCH_3)_4$, with a lithium-ion conducting liquid electrolyte, deionized water and an acid catalyst. This mixture is mixed in a container, preferably in an ultrasonic bath, for a period ranging from between about 2 seconds and about 48 hours. Preferably, the mixture is mixed for about fifteen minutes. The liquid sol or precursor is then added to the unactivated cell in a fashion similar to the way in which a liquid electrolyte is added to a liquid electrolyte lithium-ion cell. The liquid sol polymerizes or solidifies in situ forming a solid polymer electrolyte and/or separator between the anode and cathode components of the cell.

Typically, the cell is heated to a polymerization temperature of between about 0° C. and 100° C., and preferably about 55° C., and for a period of between about 1 and 50 hours, preferably about 20 hours, for example.

Aside from the preferred silica alkoxide mentioned above, the hydrolyzed metal alkoxide may be any alkoxide of a metal chosen from the following group: Al, Ti, V, Cr, Mo, and W.

The lithium ion conducting electrolyte is prepared according to the invention by dissolving a lithium containing salt which is stable in the presence of water with a carbonate containing solvent, such as a mixture of ethylene carbonate and diethylcarbonate. The lithium containing salt used in the solid electrolyte of the invention may be any alkali metal or alkaline earth metal salt which is non-reactive with water including any one of the following organic lithium salts:

(a) Lithium Bisperfluoroethanesulfonimide (LiN$(SO_2C_2F_5)_2$)

(b) Lithium Bis[5-fluoro-2-olato-1-benzenesulfonato (2-)-O,O]borate(1-) (LiB($C_6H_3FO(SO_3)$ )$_2$)

(c) Lithium bis-(trifluoromethanesulfonyl)imide (LiN$(SO_2CF_3)_2$)

(d) Lithium tris-(trifluoromethanesulfonyl)-methide (LiC$(SO_2CF_3)_3$)

(e) Lithium bis-(trifluoromethylsulfonyl)methane (LiCH$(SO_2CF_3)_2$

The preferred lithium salt for use in the solid electrolyte of the invention is lithium Bisperfluoroethanesulfonimide (LiN$(SO_2C_2F_5)_2$).

The solvent used to prepare the metal ion conducting electrolyte according to the invention is preferably a solvent selected from the group consisting of ethylene carbonate, dimethyl carbonate, diethylcarbonate, ethyl methyl carbonate, methyl propylcarbonate and dimethylether as well as mixtures thereof.

The electrochemical cell according to the invention may employ any conventional anode material but preferably the anode is carbon Other anode materials that may be used include lithium, titanium, oxide, tin oxide, tin or germanium oxide, for example. Similarly, the cathode material may be any conventional cathode material but preferably is a lithiated transition metal oxide such as lithium cobalt oxide $LiCoO_2$. Other suitable cathode materials include $LiNiO_2$, $LiNi_{0.82}Co_{0.18}O_2$ and $LiMn_2O_4$, for example.

Among the many significant advantages of the invention is the ease with which electrochemical cells may be manufactured. The solid polymer electrolyte begins as a liquid and then solidifies in situ, thus cells may be manufactured as in a liquid electrolyte system. In this case the liquid precursor may be added to an unactivated electrochemical cell, such as a lithium-ion cell, in the same manner as current Li-ion cells are charged with electrolyte. The liquid precursor spontaneously solidifies forming a solid Li-ion cell which is an inherently safe and stable cell. Unactivated cells may be identical to those used with liquid electrolytes, further the same equipment and techniques used to charge cells with liquid electrolytes may also be used with the invention minimizing costs.

Other advantages relate to safety which is extremely important. Because the electrolyte material is a solid, it cannot leak. Further, the material has low volatility and thus presents significant safety advantages relative to liquid or gel electrolytes.

Finally, the solid electrolyte material can act as not only the electrolyte but also the separator and thus very inexpensive electrochemical cells may be manufactured using this electrolyte as they need not contain a separate or filling material as is found in liquid electrolyte or gel electrolyte cells. The electrolyte of the invention is solid and forms an excellent interface between the electrode materials and electrolyte.

Of course, a distinguishing advantage of the invention over the prior art is the use of a lithium salt which is stable in the precursor mixture.

EXAMPLE

The following example will serve to further illustrate the practice of the invention.

A rechargeable lithium ion electrochemical cell was fabricated using a carbon anode, a $LiCoO_2$ cathode and a solid polymer electrolyte prepared by the sol-gel process and containing as a metal salt lithium bisperfluoroethanesulfonimide ($LiN(SO_2C_2F_5)_2$). The cell employed a conventional glass fiber separator between the carbon anode and the $LiCoO_2$ cathode. The liquid precursor to the solid polymer was prepared as follows: To a silicon alkoxide, namely, tetramethylorthosilicate (TMOS), was added twice as many moles of water and a catalytic amount (less than two equivalents) of 0.05M HCl. This mixture was mixed in a container for about fifteen minutes. In a separate container, a solution was formed of the lithium containing salt, namely, lithium bisperfluoroethanesulfonimide, in a carbonate containing solvent, i.e., a mixture of ethylene carbonate and diethylcarbonate. Equal volumes of the TMOS and carbonate solutions were then mixed to form the liquid precursor mixture. To the separator was added 5 drops of the precursor mixture and the electrochemical cell assembled. In order to polymerize the precursor and remove volatile materials the assembled cell was heated at 55° C. for 20 hours. The cell was then sealed and charged and discharged to demonstrate the effectiveness of the invention.

In the drawing, FIG. 1 shows three charge and discharge curves for the solid polymer electrochemical cell prepared in this example, demonstrating the rechargeable capabilities of the cell. FIG. 2 is a plot of data taken from this same cell showing discharge capacity versus cycle number, further demonstrating the rechargeable characeristics of the cell.

It will thus be seen that the invention provides a solid polymer electrolyte which may be processed as a liquid and then polymerized to form a solid. The polymeric portion of the material is based on polymers which use silicon and oxygen as an integral component with a lithium salt that is stable in the presence of water and an organic solvent. The material after polymerization may serve as a battery separator and is useful as a lithium conducting electrolyte while having the physical properties of a solid material. The solid electrolyte cannot leak and presents m much reduced flammability when compared to other polymer, liquid or gel electrolytes.

What is claimed is:

1. A solid electrolyte for an electrochemical cell comprising: a polymer composed of a three-dimensional inorganic metal oxide network encapsulating a liquid electrolyte solution containing a salt which is stable in the presence of water and an organic solvent.

2. A solid electrolyte according to claim 1, wherein the inorganic network is composed of an oxide of a metal selected from the group consisting of aluminum, silicon, titanium, vanadium, chromium, molybdenum and tungsten.

3. A solid electrolyte according to claim 1, wherein the inorganic network is composed of silica.

4. A solid electrolyte according to claim 1, wherein the salt is an alkali metal or alkaline earth metal salt which is stable in the presence of water.

5. A solid electrolyte according to claim 4, wherein the salt is an organic lithium salt selected from the group consisting of lithium bisperfluoroethanesulfonimide, lithium bis[5-fluoro-2-olato-1-benzenesulfonato(2-)-O,O]borate (1-), lithium bis-(trifluoromethanesulfonyl)imide, lithium tris-(trifluoromethanesulfonyl)-methide, and lithium bis-(trifluoromethylsulfonyl)methane.

6. A solid electrolyte according to claim 4, wherein the salt is lithium bisperfluoroethanesulfonimide.

7. A solid electrolyte according to claim 1, wherein the organic solvent is selected from the group consisting of ethylene carbonate, dimethyl carbonate, diethylcarbonate, ethyl methyl carbonate, methyl propylcarbonate and dimethylether as well as mixtures thereof.

8. An electrochemical cell comprising an anode, a cathode and a solid electrolyte disposed therebetween, said solid electrolyte comprising a polymer composed of a three-dimensional inorganic metal oxide network encapsulating a liquid electrolyte solution containing a salt which is stable in the presence of water and an organic solvent.

9. An electrochemical cell according to claim 8, wherein the anode is composed of carbon.

10. An electrochemical cell according to claim 9, wherein the cathode is composed of a lithiated transition metal oxide.

11. An electrochemical cell according to claim 10, wherein the cathode is composed of $LiCoO_2$.

12. An electrochemical cell according to claim 8, wherein the inorganic network is composed of silica.

13. An electrochemical cell according to claim 8, wherein the salt is an organic lithium salt selected from the group consisting of lithium bisperfluoroethanesulfonimide, lithium bis[5-fluoro-2-olato-1-benzenesulfonato(2-)-O,O]borate (1-), lithium bis-(trifluoromethanesulfonyl)imide, lithium tris-(trifluoromethanesulfonyl)-methide, and lithium bis-(trifluoromethylsulfonyl)methane.

14. An electrochemical cell according to claim 13, wherein the salt is lithium bisperfluoroethanesulfonimide.

15. A solid electrolyte for an electrochemical cell comprising: a solid polymer composed of a three-dimensional inorganic network composed of an oxide of a metal selected from the group consisting of aluminum, silicon, titanium, vanadium, chromium, molybdenum and tungsten, encapsulating a liquid electrolyte solution containing an organic lithium salt selected from the group consisting of lithium bisperfluoroethanesulfonimide, lithium bis[5-fluoro-2-olato-1-benzenesulfonato (2-)-O,O]borate(1-), lithium bis-(trifluoromethanesulfonyl)imide, lithium tris-(trifluoromethanesulfonyl)-methide, and lithium bis-(trifluoromethylsulfonyl)methane.

16. A solid electrolyte for an electrochemical cell comprising: a three-dimensional inorganic polymer network composed of an oxide of a metal selected from the group consisting of aluminum, silicon, titanium, vanadium, chromium, molybdenum and tungsten, encapsulating a liquid electrolyte solution containing an alkali metal or alkaline earth metal salt which is stable in the presence of water.

17. A solid electrolyte for an electrochemical cell comprising: a three-dimensional inorganic polymer network composed of an oxide of a metal selected from the group consisting of aluminum, silicon, titanium, vanadium, chromium, molybdenum and tungsten, encapsulating a liquid electrolyte solution containing an organic lithium salt selected from the group consisting of lithium bisperfluoroethanesulfonimide, lithium bis[5-fluoro-2-olato-1-benzenesulfonato(2-)-O,O]borate (1-), lithium bis-(trifluoromethanesulfonyl)imide, lithium tris-(trifluoromethanesulfonyl)-methide, and lithium bis-(trifluoromethylsulfonyl)methane.

18. A solid electrolyte according to claim 17, wherein the salt is lithium bisperfluoroethanesulfonimide.

19. An electrochemical cell comprising an anode, a cathode and a solid electrolyte disposed therebetween, said anode comprising carbon and said solid electrolyte comprising a polymer composed of a three-dimensional inorganic metal oxide network encapsulating a liquid electrolyte solution containing a salt which is stable in the presence of water and an organic solvent.

20. An electrochemical cell according to claim 19, wherein the cathode is composed of a lithiated transition metal oxide.

21. An electrochemical cell according to claim 20, wherein the cathode is composed of $LiCoO_2$.

22. An electrochemical cell comprising an anode, a cathode and a solid electrolyte disposed therebetween, said solid electrolyte comprising a polymer composed of a three-dimensional inorganic metal oxide network encapsulating a liquid electrolyte solution containing an organic lithium salt selected from the group consisting of lithium bisperfluoroethanesulfonimide, lithium bis[5-fluoro-2-olato-1-benzenesulfonato (2-)-O,O]borate(1-), lithium bis-(trifluoromethanesulfonyl)imide, lithium tris-(trifluoromethanesulfonyl)-methide, and lithium bis-(trifluoromethylsulfonyl)methane.

23. An electrochemical cell according to claim 22, wherein the salt is lithium bisperfluoroethanesulfonimide.

* * * * *